(12) United States Patent
Shimono et al.

(10) Patent No.: US 10,974,484 B2
(45) Date of Patent: Apr. 13, 2021

(54) FORMING METHOD OF CYLINDRICAL COMPOSITE MATERIAL, INNER SURFACE LAYERING DEVICE, AND CYLINDRICAL COMPOSITE MATERIAL

(71) Applicant: MITSUBISHI HEAVY INDUSTRIES, LTD., Tokyo (JP)

(72) Inventors: Kodai Shimono, Tokyo (JP); Ryoji Okabe, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 179 days.

(21) Appl. No.: 16/279,365

(22) Filed: Feb. 19, 2019

(65) Prior Publication Data

US 2019/0283363 A1    Sep. 19, 2019

(30) Foreign Application Priority Data

Mar. 13, 2018   (JP) .............................. JP2018-046007

(51) Int. Cl.
  *B32B 7/03*   (2019.01)
  *B32B 1/08*   (2006.01)
  (Continued)

(52) U.S. Cl.
  CPC ................ *B32B 7/03* (2019.01); *B29C 70/34* (2013.01); *B32B 1/08* (2013.01); *B32B 5/26* (2013.01);
  (Continued)

(58) Field of Classification Search
  CPC .... B32B 7/03; B32B 1/08; B32B 5/26; B32B 7/12; B29C 70/34; B29C 53/60; B29L 2023/22
  (Continued)

(56) References Cited

U.S. PATENT DOCUMENTS

| 5,427,373 A | 6/1995 | Kusumoto |
| 2009/0097890 A1* | 4/2009 | Oyama .............. G03G 15/2053 399/329 |

FOREIGN PATENT DOCUMENTS

| EP | 0 873 685 | 10/1998 | |
| EP | 0873685 A1 * | 10/1998 | ............. A01K 87/00 |

(Continued)

OTHER PUBLICATIONS

Notice of Reasons for Refusal dated Jan. 28, 2020 in corresponding Japanese Patent Application No. 2018-046007, with English Translation.

*Primary Examiner* — Philip C Tucker
*Assistant Examiner* — Vicki Wu
(74) *Attorney, Agent, or Firm* — Wenderoth, Lind & Ponack, L.L.P.

(57) ABSTRACT

A forming method of a cylindrical composite material includes layering a plurality of composite material sheets in a cylindrical shape with splices formed between ends of adjacent composite material sheets such that phases of the splices in a circumferential direction differ from each other; heating the composite material sheets layered at the layering while pressurizing the composite material sheets in a state where the layered composite material sheets are disposed along an inner surface of a composite material cylindrical mold to cause a resin included in the composite material sheets to react to combine the composite material sheets to be formed in a cylindrical shape; and performing an adhesion pretreatment that is performed before the heating and allows the inner surface of the composite material cylindrical mold to adhere to an outermost composite material sheet of the layered composite material sheets.

7 Claims, 9 Drawing Sheets

(51) Int. Cl.
*B29C 70/34* (2006.01)
*B32B 5/26* (2006.01)
*B32B 7/12* (2006.01)
B29L 23/00 (2006.01)
B29C 53/60 (2006.01)

(52) U.S. Cl.
CPC ................ *B32B 7/12* (2013.01); *B29C 53/60* (2013.01); *B29L 2023/22* (2013.01)

(58) Field of Classification Search
USPC .................................................... 264/171.26
See application file for complete search history.

(56) References Cited

FOREIGN PATENT DOCUMENTS

| | | |
|---|---|---|
| JP | 59-171618 | 9/1984 |
| JP | 6-23076 | 2/1994 |
| JP | 06-238756 | 8/1994 |
| JP | 10-291265 | 11/1998 |
| JP | 11-115064 | 4/1999 |

\* cited by examiner

FORMING METHOD OF CYLINDRICAL COMPOSITE MATERIAL, INNER SURFACE LAYERING DEVICE, AND CYLINDRICAL COMPOSITE MATERIAL

CROSS-REFERENCE TO RELATED APPLICATIONS

The present application claims priority to and incorporates by reference the entire contents of Japanese Patent Application No. 2018-046007 filed in Japan on Mar. 13, 2018.

FIELD

The present invention relates to a forming method of a cylindrical composite material, an inner surface layering device, and a cylindrical composite material.

BACKGROUND

Composite materials obtained by impregnating reinforcing fibers with a resin are used for air planes, automobiles, vehicles, and ships, for example. The composite materials have high strength and are lightweight. An active consideration is, thus, given to the use of the composite materials as members moving at high speed such as rotors of motors by forming the composite materials in a cylindrical shape.

A method has been developed that forms a composite material in a tubular body by winding reinforcing fibers impregnated with resin on an outer surface of a mold having a columnar shape or a cylindrical shape and pressurizing and heating it to cure the resin (refer to Patent Literature 1).

CITATION LIST

Patent Literature

Patent Literature 1: Japanese Patent Application Laid-open No. H11-115064

SUMMARY

Technical Problem

When the composite material is used for the members moving at high speed such as rotors of motors, the composite material needs to be formed in a cylindrical shape having a thick thickness. When a plurality of composite material sheets are layered, pressurized, and heated to form in a cylindrical shape having a thick thickness using the method in Patent Literature 1, a meandering portion may occur in the composite material sheet layered on an outer surface side caused by thickness reduction due to the pressurization and the heating. As a result, a problem arises in that the formed material is unable to withstand being used for the members moving at high speed such as rotors of motors.

The present invention has been made in view of the above problem, and has an object to provide a forming method of a cylindrical composite material, an inner surface layering device, and a cylindrical composite material that reduce possibility of a meandering portion occurring in a composite material sheet even when the composite material is formed in a cylindrical shape having a thick thickness.

Solution to Problem

To solve the problem described above and achieve the object, a forming method of a cylindrical composite material includes layering a plurality of composite material sheets in a cylindrical shape with splices formed between ends of adjacent composite material sheets such that phases of the splices in a circumferential direction differ from each other; and heating the composite material sheets layered at the layering while pressurizing the composite material sheets in a state where the layered composite material sheets are disposed along an inner surface of a composite material cylindrical mold to cause a resin included in the composite material sheets to react to combine the composite material sheets to be formed in a cylindrical shape.

With this configuration, the splices are formed between ends of adjacent composite material sheets, thereby making it possible for the composite material sheets to easily follow thickness reduction as a result of the reaction of the resin at the heating by the opening of the splice. As a result, pressure can be applied uniformly up to an outer surface portion. In addition, at the layering, the composite material sheets are layered with the gap splices interposed therebetween without being fully overlapped, and furthermore, the phases of the splices differ from each other, thereby making it possible to minimize strength reduction due to the splices. The pressurization and heating processing are performed in the state where the layered composite material sheets are disposed along the inner surface of the cylindrical mold. This can prevent air gaps from being formed in the composite material sheets caused by the situation that pressure applied from the inside of the layered composite material sheets in the radius direction is not transferred to the outside of the layered composite material sheets in the radius direction due to expansion of the cylindrical mold, and the fibers from meandering due to compression of the cylindrical mold, for example. As a result, the possibility of the meandering portion occurring in the composite material sheet can be reduced although the composite material is formed in a cylindrical shape having a thick thickness.

In the configuration described above, it is preferable that, at the layering, the composite material sheets are inwardly layered on an inner surface of the cylindrical mold. This configuration allows the layering to smoothly form a state for the processing at the heating in a series of flow, thereby making it possible to increase accuracy in shape of the cylindrical composite material after being formed.

Alternatively, in the configuration described above, it is preferable that, at the layering, the composite material sheets are outwardly layered on an outer surface of another cylindrical mold different from the cylindrical mold used at the heating, and after the layering, the other cylindrical mold is pulled out. This configuration allows the layering to be performed using various conventional techniques, thereby making it possible to preferably utilize conventional facilities.

In the configurations described above, it is preferable that the forming method of a cylindrical composite material further includes performing an adhesion pretreatment that is performed before the heating and allows the inner surface of the composite material cylindrical mold to adhere to an outermost composite material sheet of the layered composite material sheets. This configuration can obtain the cylindrical composite material in which the composite material cylindrical mold is adhesively bonded on the outer surface of the layered composite material sheets as a result of the heating. The composite material cylindrical mold can increase accuracy in outer surface shape of the cylindrical composite material.

In the configurations described above, it is preferable that, at the heating, dam members having a ring shape are disposed at positions on both end sides in an axial direction of the composite material sheets disposed on the inner surface of the cylindrical mold and inside a pressurization-heating case used in pressurization and heating, the dam members have the same linear expansion as the cylindrical mold used at the heating and protect both end sides of the composite material sheets in the axial direction of the composite material sheets. This configuration allows the dam members to protect both end sides in the axial direction of the composite material sheets, thereby making it possible to increase accuracy in shape on both end sides in the axial direction of the cylindrical composite material.

To solve the problem described above and achieve the object, an inner periphery layering device includes a support roller that supports a cylindrical mold from outside of the cylindrical mold such that the cylindrical mold is rotatable; and a press roller that presses the sheets layered on the inner surface of the cylindrical mold from inside.

This configuration can layer the multiple composite material sheets while the press roller tightly presses the composite material sheets from the inside toward the inner surface of the cylindrical mold supported by the support roller. The inner surface layering device, thus, can reduce gaps between layers of the layered composite material sheets.

To solve the problem described above and achieve the object, a cylindrical composite material includes a plurality of composite material sheets layered in a cylindrical shape and combined. Splices are formed between ends of adjacent composite material sheets and phases of the splices in a circumferential direction differ from each other.

This configuration allows the splices formed between ends of adjacent composite material sheets to make it possible for the composite material sheets to easily follow thickness reduction caused by the reaction of the resin by the opening of the splices. The cylindrical composite material is, thus, obtained as a result of applying pressure uniformly up to the outer surface portion. The respective composite material sheets are layered with the gap splices interposed therebetween without being fully overlapped, and furthermore, the phases of the splices differ from each other, thereby making it possible to minimize strength reduction due to the splice.

In the configuration described above, it is preferable that the cylindrical composite material further includes a composite material cylindrical mold that is disposed on an outer surface of the composite material sheets layered in the cylindrical shape; and an adhesive layer that adhesively bonds the composite material sheets layered in the cylindrical shape and the composite material cylindrical mold. This configuration allows the cylindrical mold to increase accuracy in outer surface shape of the cylindrical composite material.

In the configurations described above, it is preferable that, in a whole material including the composite material sheets layered in the cylindrical shape, an inner-outer radius ratio is smaller than 0.95 and an inner radius is equal to or larger than 100 mm, the inner-outer radius ratio being a ratio of the inner radius to an outer radius. This configuration can reduce the possibility of the meandering portion occurring in the composite material sheet even when the cylindrical composite material has a thick thickness, i.e., the inner-outer radius ratio is smaller than 0.95 and the inner radius is equal to or larger than 100 mm.

DESCRIPTION OF EMBODIMENTS

Embodiments according to the invention will be described in detail below with reference to the accompanying drawings. The following embodiments do not limit the invention. The constituent elements described in the following embodiments include those easily envisaged by those skilled in the art and substantially identical ones. The constituent elements described below can be combined as appropriate.

First Embodiment

Figure 1:
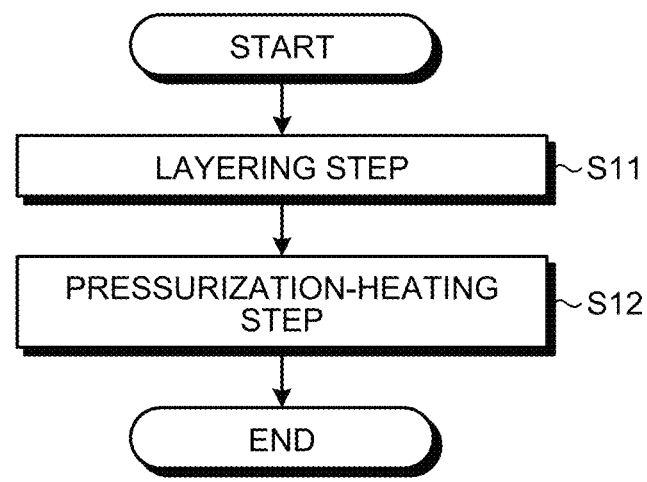
FIG. 1 is a flowchart illustrating a forming method of a cylindrical composite material according to a first embodiment.

FIG. 1 is a flowchart illustrating a forming method of a cylindrical composite material according to a first embodiment. The forming method of a cylindrical composite material according to the first embodiment includes a layering step S11 and a pressurization-heating step S12 as illustrated in FIG. 1.

Figure 2:
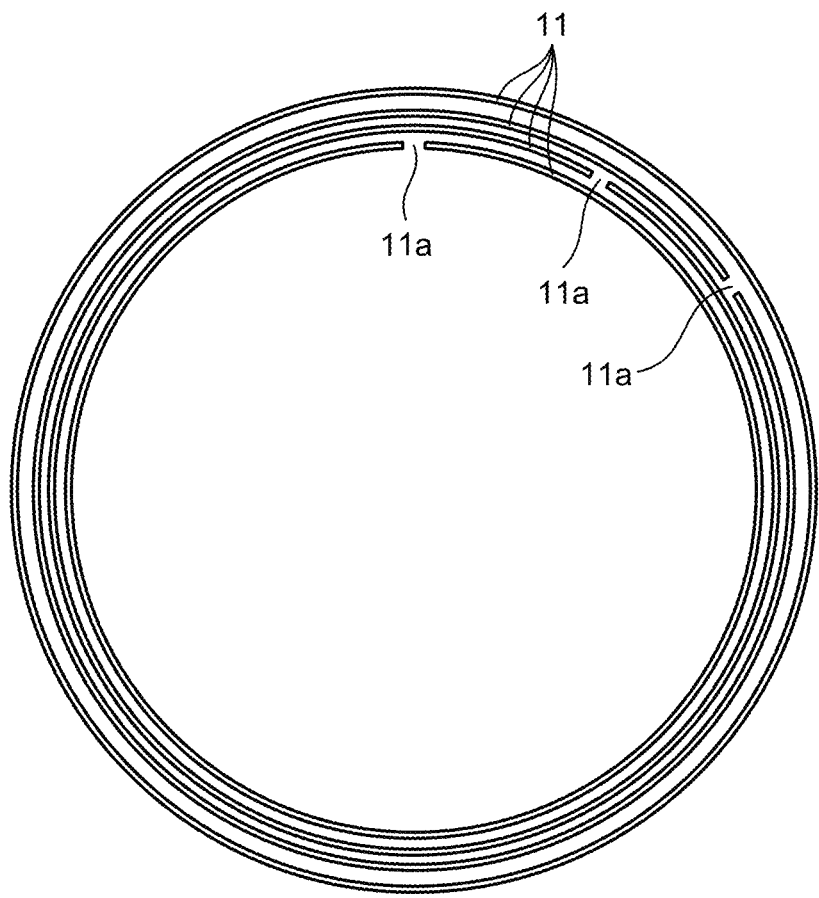
FIG. 2 is an explanatory view explaining a layering step in FIG. 1.

FIG. 2 is a diagram explaining the layering step S11 in FIG. 1. FIG. 2 is a diagram illustrating an axial direction view of a plurality of composite material sheets 11 layered in a cylindrical shape. At the layering step S11, as illustrated in FIG. 2, the composite material sheets 11 are layered in a cylindrical shape with gaps called splices 11a formed between ends of adjacent composite material sheets 11 such that phases of the splices 11a in a circumferential direction differ from each other between the composite material sheets 11 adjacent in a radius direction.

The composite material sheet 11 is made by forming a complex material in a sheet shape, the complex material being obtained by impregnating reinforcing fibers with a resin. The composite material sheet 11, which has high strength and is lightweight, is preferably used for air planes, auto mobiles, vehicle, and ships, for example. An example of the reinforcing fiber used for the composite material sheet 11 is a bundle of several hundreds to several thousands of basic fibers having a thickness between 5 µm and 7 µm inclusive. Preferable examples of the basic fibers, which are included in the reinforcing fiber used for the composite material sheet 11, include carbon fibers, glass fibers, plastic fibers, aramid fibers, and metallic fibers.

A preferable example of the resin used for the composite material sheet 11 is a thermoset resin. Examples of the thermoset resin include an epoxy resin, a polyester resin, and a vinyl ester resin. The resin used for the composite material sheet 11 may include a thermoplastic resin. Examples of the thermoplastic resin include a polyimide resin, a polypropylene resin, an acrylonitrile butadiene styrene (ABS) resin, polyetheretherketone (PEEK), polyetherketoneketone (PEKK), and polyphenylenesulfide (PPS). The resin used for the composite material sheet 11 is not limited to those described above. Other resins may be used. The resin included in the composite material sheet 11 has an unreacted portion before being pressurized and heated at pressurization-heating step S12. The reaction of the resin included in the composite material sheet 11 is reaction to combine the multiple composite material sheets 11. When the resin is a thermoset resin, the reaction is curing reaction.

At the layering step S11, two types of methods are mainly employed. A first type method employed at the layering step S11 is a method in which the multiple composite material sheets 11 are inwardly layered on an inner surface of a composite material cylindrical mold 12 (refer to FIGS. 3 and 4) serving as a cylindrical mold used at the pressurization-heating step S12. In this case, a state for the processing at the pressurization-heating step S12 can be smoothly formed in a series of flow of the layering step S11, thereby making it possible to increase accuracy in shape of a cylindrical composite material 10 (refer to FIG. 7) after being formed. The composite material cylindrical mold 12 will be described later.

Figure 3:
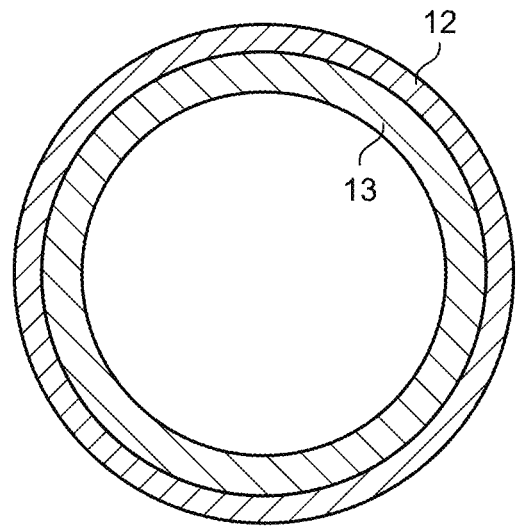
FIG. 3 is an explanatory view explaining a preparation step of a cylindrical mold, the preparation step being performed in the forming method of a cylindrical composite material illustrated in FIG. 1.
Figure 4:
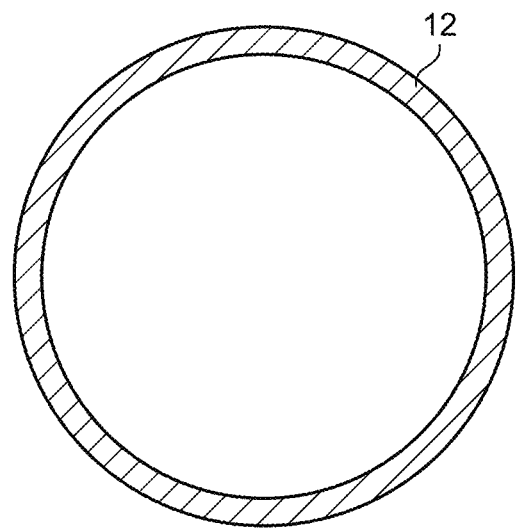
FIG. 4 is a schematic diagram illustrating an outline of the cylindrical mold obtained after a state illustrated in FIG. 3.

FIG. 3 is an explanatory view explaining a preparation step of the composite material cylindrical mold 12. The preparation step is performed in the forming method of the cylindrical composite material in FIG. 1. FIG. 4 is a schematic diagram illustrating an outline of the composite material cylindrical mold 12 obtained after the state illustrated in FIG. 3. FIGS. 3 and 4 are cross-sectional views along a direction perpendicular to the axial direction of the composite material cylindrical mold 12. When the first type method is employed at the layering step S11, the forming method of the cylindrical composite material needs to perform the preparation step for preparing the composite material cylindrical mold 12 before the layering step S11 employing the first type method.

At the preparation step of the composite material cylindrical mold 12, first, as illustrated in FIG. 3, a cylindrical mold 13 is prepared that has an outer surface having an outer diameter equal to an inner diameter of an inner surface of the composite material cylindrical mold 12 to be prepared. Then, at the preparation step, as illustrated in FIG. 3, the composite material is formed on the outer surface of the cylindrical mold 13 to form the composite material cylindrical mold 12. As the forming method of the composite material at the preparation step, a filament winding (FW) method and a sheet winding (SW) method, which are known methods, can be preferably employed. Thereafter, at the preparation step, the cylindrical mold 13 is pulled out, resulting in the composite material cylindrical mold 12 being obtained as illustrated in FIG. 4. At the preparation step, it is preferable that the composite material is thinly formed on the outer surface of the cylindrical mold 13 thin so as to thinly form the composite material cylindrical mold 12. In this case, the composite material cylindrical mold 12 having relatively high shape accuracy can be obtained using known methods. In the first embodiment, the composite material cylindrical mold 12 is used as the cylindrical mold. The present invention is, however, not limited to using the composite material cylindrical mold 12. A cylindrical mold formed of other materials may be used.

Figure 5:
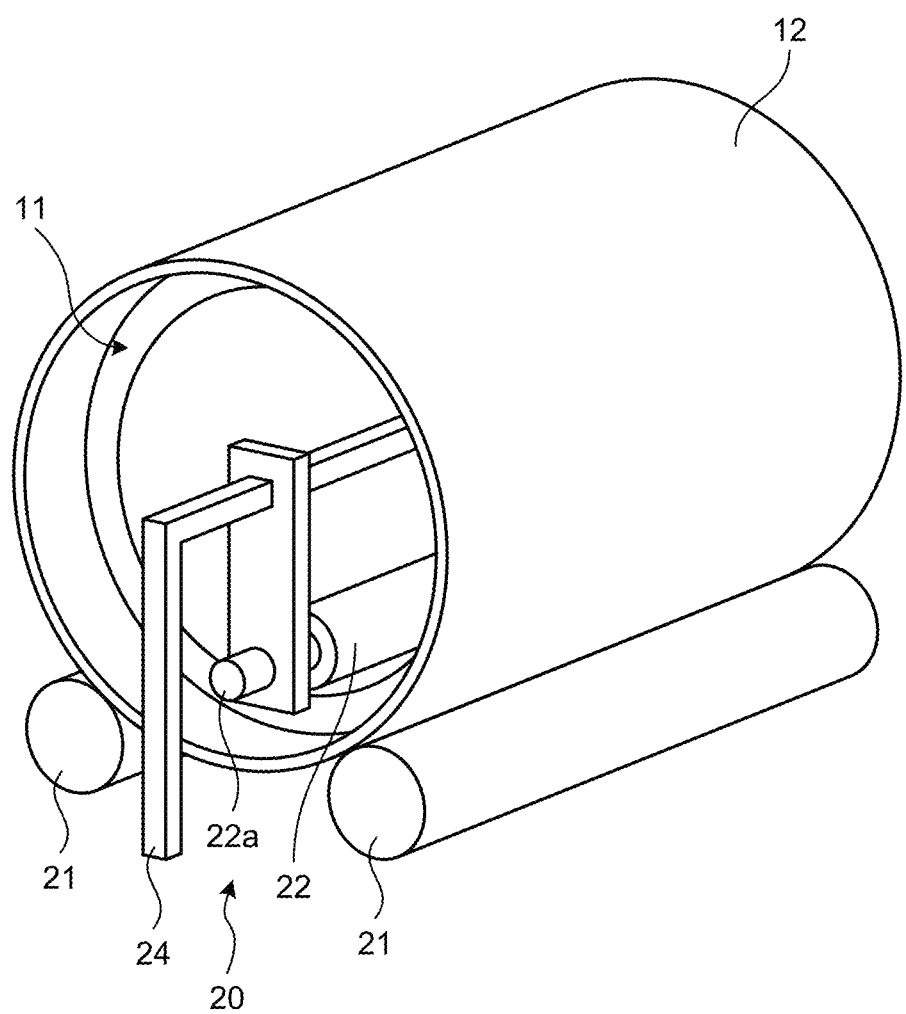
FIG. 5 is a perspective view illustrating an outline of an inner surface layering device used in the layering step in FIG. 1.

FIG. 5 is a perspective view illustrating an outline of an inner surface layering device 20 used at the layering step S11 in FIG. 1. The inner surface layering device 20 is preferably used at the layering step S11 employing the first type method, in which the multiple composite material sheets 11 are layered inwardly on the inner surface of the composite material cylindrical mold 12. As illustrated in FIG. 5, the inner surface layering device 20 includes support rollers 21 and a press roller 22. The two support rollers 21 are provided in parallel with each other in the horizontal direction and in a rotatable manner. The support rollers 21 support the composite material cylindrical mold 12, which is an example of the cylindrical mold, from the outside of the composite material cylindrical mold 12 such that the composite material cylindrical mold 12 can rotate.

As illustrated in FIG. 5, the press roller 22 is supported at shaft ends 22a on both sides thereof by a roller supporting member 24. The roller supporting member 24 supports the press roller 22 at the shaft ends 22a on both sides such that the press roller 22 can rotate on a cylindrical surface at a certain distance from the central axis of the composite material cylindrical mold 12. The press roller 22 thus structured can press the composite material sheets 11 from the inside with equal force causing the thickness of the layered composite material sheets 11 to be equalized without depending on a circumferential position. The composite material sheets 11 are an example of a plurality of sheets layered on the inner surface of the composite material cylindrical mold 12, which is an example of the cylindrical mold. In the inner surface layering device 20, which includes the support rollers 21 and the press roller 22 thus structured, a position at which the press roller 22 presses the composite material sheets 11 is moved in accordance with the rotation movement of the composite material cylindrical mold 12.

The inner surface layering device 20 thus structured can layer the multiple composite material sheets 11 while the press roller 22 tightly presses the composite material sheets 11 from the inside toward the inner surface of the composite material cylindrical mold 12 supported by the support rollers 21 at the layering step S11 employing the first type method. The inner surface layering device 20, thus, can reduce gaps between layers of the layered composite material sheets 11.

A second type method employed at the layering step S11 is a method in which the multiple composite material sheets 11 are outwardly layered on the outer surface of a cylindrical mold different from the composite material cylindrical mold 12 (refer to FIGS. 3 and 4) used at the pressurization-heating step S12, and the cylindrical mold is pulled out after the multiple composite material sheets 11 are layered. In this case, the layering step S11 can be performed using various techniques that have been conventionally and preferably used for outwardly layering sheets, thereby making it possible to preferably utilize facilities having been used conventionally.

At the pressurization-heating step S12, the multiple composite material sheets 11 layered at the layering step S11 are heated while being pressurized in a state where the composite material sheets 11 are disposed along the inner surface of the composite material cylindrical mold 12 (refer to FIGS. 3 and 4), thereby causing the resin included in the composite material sheets 11 to react. As a result, the composite material sheets 11 are combined to be formed in a cylindrical shape.

When the layering step S11 employs the second type method, first, a preparation step for preparing the composite material cylindrical mold 12 needs to be performed prior to the pressurization-heating step S12. When the composite material cylindrical mold 12 is used and the first type method is employed at the layering step S11, which is performed before the pressurization-heating step S12, the preparation step at which the composite material cylindrical mold 12 is prepared is already performed before the layering step S11, thus, no preparation step needs to be performed in this case.

At pressurization-heating step S12, first, a state is formed in which the multiple composite material sheets 11 layered at the layering step S11 are disposed along the inner surface of the composite material cylindrical mold 12. When the layering step S11 employs the first type method, the state just after the layering step S11 can be used at pressurization-heating step S12 without any change. When the layering step S11 employs the second type method, this state can be formed at the pressurization-heating step S12 by disposing the composite material sheets 11 obtained by being layered at the layering step S11 along the inner surface of the composite material cylindrical mold 12.

Figure 6:
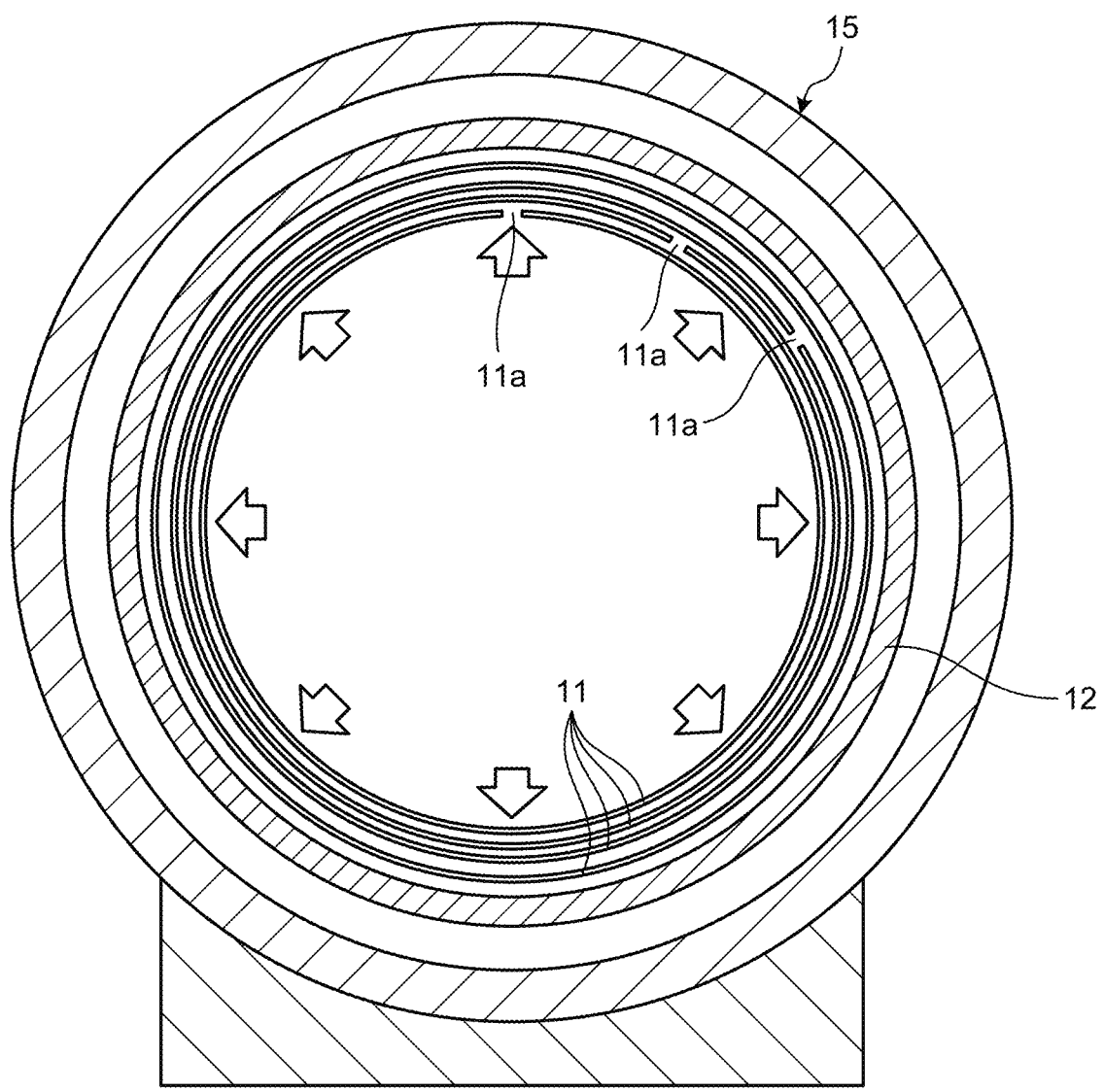
FIG. 6 is an explanatory view explaining a pressurization-heating step in FIG. 1.

FIG. 6 is an explanatory view explaining the pressurization-heating step S12 in FIG. 1. FIG. 6 is a cross-sectional view along a direction perpendicular to the axial direction of the composite material sheets 11, the composite material cylindrical mold 12, and a sealed pressurization-heating device 15. At the pressurization-heating step S12, the layered composite material sheets 11 are then heated while being pressurized with the state kept in which the composite material sheets 11 are disposed along the inner surface of the composite material cylindrical mold 12. Specifically, at the pressurization-heating step S12, the layered composite material sheets 11 disposed along the inner surface of the composite material cylindrical mold 12 and the composite material cylindrical mold 12 are sealed in a pressurization-heating case (not illustrated). The pressurization-heating case is put into the sealed pressurization-heating device 15 illustrated in FIG. 6. The sealed pressurization-heating device 15 performs heating while performing pressurization.

At the pressurization-heating step S12, to the layered composite material sheets 11, force of pressure of the sealed pressurization-heating device 15 is applied along the arrows directed toward the outside of the layered composite material sheets 11 in the radius direction illustrated in FIG. 6. The composite material cylindrical mold 12 has the same linear expansion as the composite material sheet 11. This can prevent air gaps from being formed in the composite material sheets 11 caused by the situation that pressure applied from the inside of the layered composite material sheets 11 in the radius direction is not transferred to the outside of the layered composite material sheets 11 in the radius direction due to expansion of the composite material cylindrical mold 12, and the fibers from meandering due to compression of the composite material cylindrical mold 12, for example, at the pressurization-heating step S12.

At the pressurization-heating step S12, the composite material cylindrical mold 12 is preferably used as the cylindrical mold in the same manner as the first embodiment. In this case, the composite material cylindrical mold 12 is expanded by being heated in accordance with the thermal expansion coefficient of the composite material in the same manner as the composite material sheet 11. This can prevent air gaps from being formed in the composite material sheets 11 caused by the situation that pressure applied from the inside of the layered composite material sheets 11 in the radius direction is not transferred to the outside of the layered composite material sheets 11 in the radius direction due to expansion of the composite material cylindrical mold 12, and the fibers from meandering due to compression of the composite material cylindrical mold 12, for example, at the pressurization-heating step S12.

At the pressurization-heating step S12 in the first embodiment, an autoclave device is used as the sealed pressurization-heating device 15, and the inside of the sealed pressurization-heating device 15 is highly pressurized by gas. As a result, heating is performed while pressurization is performed. At the pressurization-heating step S12, the composite material sheets 11 are heated while being pressurized, thereby causing the resin included in the composite material sheets 11 to react. As a result, the composite material sheets 11 are combined to be formed in a cylindrical shape. When the resin included in the composite material sheets 11 is a thermostat resin, at the pressurization-heating step S12, the composite material sheets 11 are combined by the curing reaction of the thermostat resin.

After the layering step S11 and the pressurization-heating step S12, the composite material cylindrical mold 12 is taken out from the composite material sheets 11 having been combined. As a result, the cylindrical composite material 10 (refer to FIG. 7) according to the first embodiment is obtained. As a method for taking out the composite material cylindrical mold 12, a method may be employed in which the composite material sheets 11 having been combined is pulled out from the composite material cylindrical mold 12, or another method may be employed in which the composite material cylindrical mold 12 is taken out by being divided.

The forming method of a cylindrical composite material according to the first embodiment described above forms the splices 11a between ends of adjacent composite material sheets 11, and thus makes it possible for each composite material sheet 11 to easily follow thickness reduction caused by the reaction of the resin at the pressurization-heating step S12 by the opening of the splice 11a. The forming method of a cylindrical composite material according to the first embodiment can apply pressure uniformly up to the outer surface portion. At the layering step S11, the composite material sheets 11 are layered with the gap splice interposed therebetween without being fully overlapped, and furthermore, the phases of the splices 11a differ from each other, thereby making it possible to minimize strength reduction due to the splices 11a. The pressurization and heating processing are performed in the state where the layered composite material sheets 11 are disposed along the inner surface of the composite material cylindrical mold 12. This can prevent air gaps from being formed in the composite material sheets 11 caused by the situation that pressure applied from the inside of the layered composite material sheets 11 in the radius direction is not transferred to the outside of the layered composite material sheets 11 in the radius direction due to expansion of the composite material cylindrical mold 12, and the fibers from meandering due to compression of the composite material cylindrical mold 12, for example. As a result, the possibility of the meandering portion occurring in the composite material sheet 11 can be reduced even when the composite material is formed in a cylindrical shape having a thick thickness.

Figure 7:
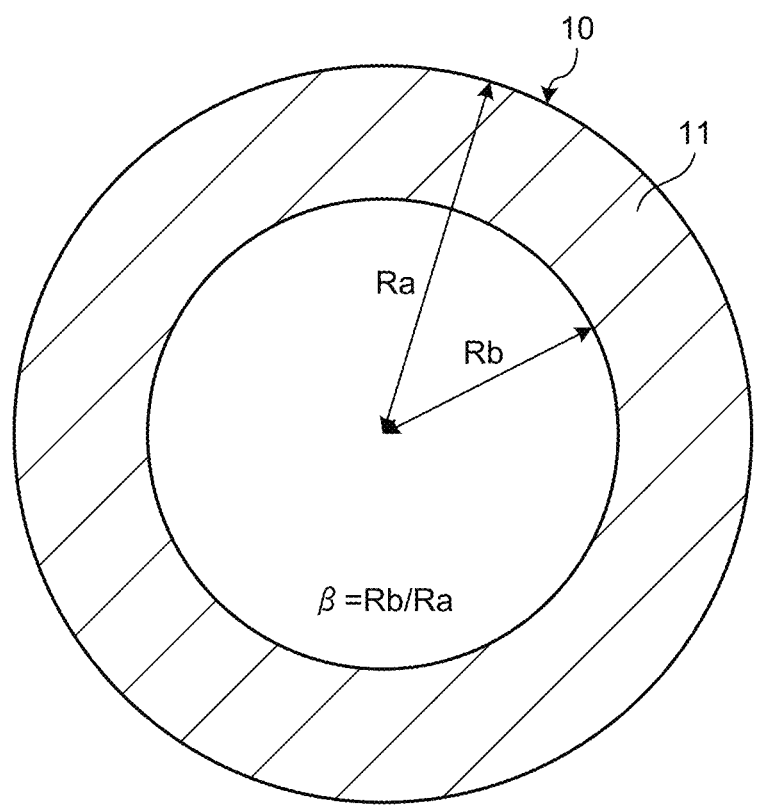
FIG. 7 is a schematic view illustrating an outline of a cylindrical composite material obtained by the forming method of a cylindrical composite material illustrated in FIG. 1.
Figure 8:
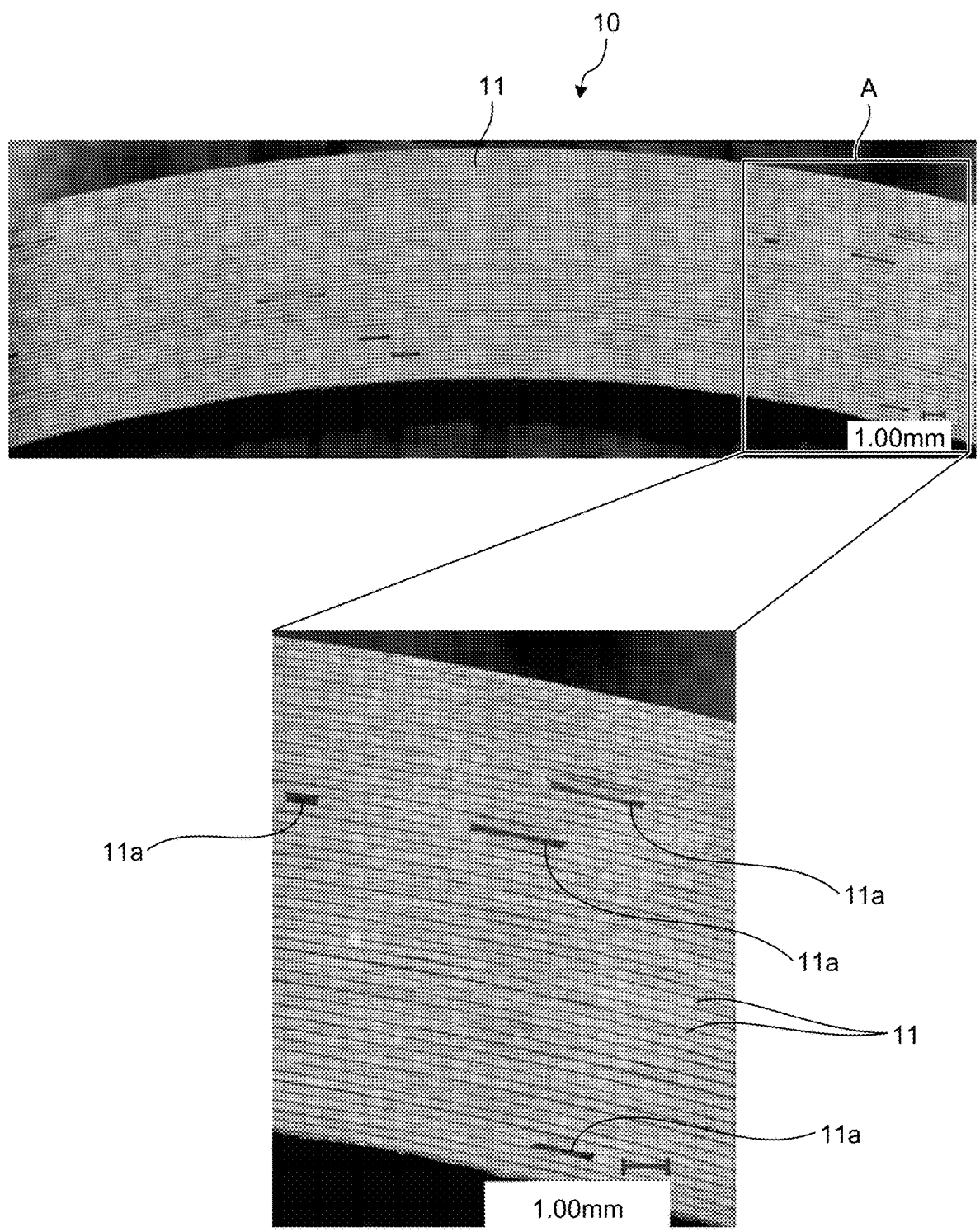
FIG. 8 is an explanatory view illustrating details of the cylindrical composite material in FIG. 7.

FIG. 7 is a schematic diagram illustrating an outline of the cylindrical composite material 10 obtained by the forming method of a cylindrical composite material in FIG. 1. FIG. 8 is an explanatory view illustrating details of the cylindrical composite material 10 in FIG. 7. FIG. 7 is a cross-sectional view along a direction perpendicular to the axial direction of the cylindrical composite material 10. FIG. 8 includes a taken image of a part of the cross section along the direction perpendicular to the axial direction of the cylindrical composite material 10 and an enlarged image taken by enlarging a region A in the partial image.

As illustrated in FIG. 7, the cylindrical composite material 10 includes the composite material sheets 11 that are layered in a cylindrical shape and combined. As illustrated in FIG. 7, the cylindrical composite material 10 has an inner radius Rb and an outer radius Ra. An inner-outer radius ratio β, which is a ratio of the inner radius to the outer radius, is Rb/Ra. The cylindrical composite material 10, which is formed in a cylindrical shape and has high strength and is light weight, is preferably used for the members moving at high speed such as rotors of motors.

The cylindrical composite material 10 preferably has a thick thickness, i.e., the inner-outer radius ratio β is smaller than 0.95. The cylindrical composite material 10 is preferably relatively large in typical cylindrical materials, i.e., the inner radius Rb is equal to or larger than 100 mm. The cylindrical composite material 10 is easily preferably used for the members moving at high speed such as rotors of motors, and reduces the possibility of the meandering portion occurring in the composite material sheet 11, even when the cylindrical composite material 10 has a thick thickness and a large shape, the thick thickness and the large shape easily causing the meandering portion to occur when the cylindrical composite material 10 is formed using conventional techniques.

As illustrated in FIG. 8, the cylindrical composite material 10 preferably has the splices 11a formed between ends of adjacent composite material sheets 11. As illustrated in FIG. 8, the splices 11a in the cylindrical composite material 10 exemplarily have a length of about 1 mm. The invention is not limited to this example. The splice 11a may have any length that does not deform the cylindrical shape of the composite material sheet 11 and makes it possible for the splices 11a to reduce the possibility of the meandering portion occurring in the composite material sheet 11. As illustrated in FIG. 8, it is preferable for the cylindrical composite material 10 that the phases of the splices 11a, which are formed between adjacent composite material sheets 11, in the circumferential direction differ from each other. In those cases, the splices 11a formed between ends of adjacent composite material sheets 11 make it possible for the composite material sheets 11 to easily follow thickness reduction caused by the reaction of the resin by the opening of the splice 11a. The cylindrical composite material 10 is obtained as a result of applying pressure uniformly up to the outer surface portion. The respective composite material sheets 11 are layered with the gap splice interposed therebetween without being fully overlapped, and furthermore, the phases of the splices 11a differ from each other, thereby making it possible to minimize strength reduction due to the splice 11a.

Second Embodiment

Figure 9:
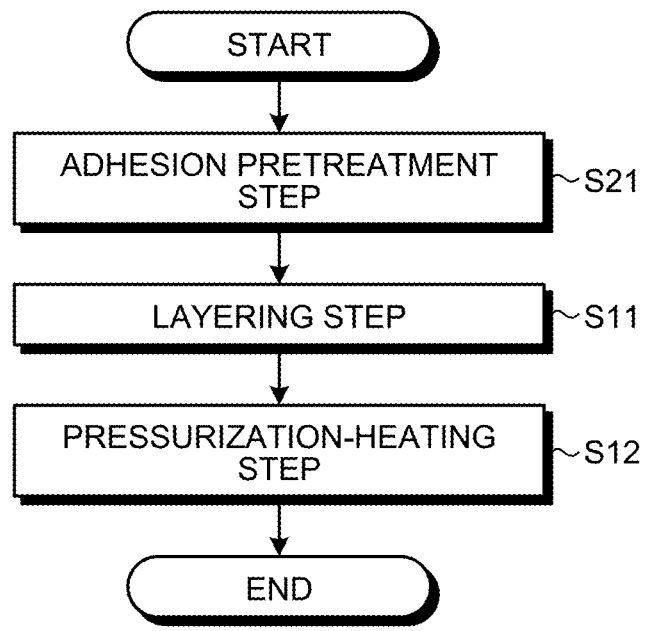
FIG. 9 is a flowchart illustrating a forming method of a cylindrical composite material according to a second embodiment.

FIG. 9 is a flowchart illustrating a forming method of a cylindrical composite material according to a second embodiment. As illustrated in FIG. 9, the forming method of a cylindrical composite material according to the second embodiment further includes an adhesion pretreatment step S21 before at least the pressurization-heating step S12. The steps other than the additional step of the forming method of a cylindrical composite material according to the second embodiment is the same as those of the forming method of a cylindrical composite material according to the first embodiment. The following describes the forming method of a cylindrical composite material according to the second embodiment. In the forming method of a cylindrical composite material according to the second embodiment, the same numerals are used for the same structure as the first embodiment and detailed descriptions thereof are omitted.

At the adhesion pretreatment step S21, which is performed before the pressurization-heating step S12, adhesion pretreatment is performed that allows the inner surface of the composite material cylindrical mold 12 to adhere to the outermost composite material sheet 11. In the first embodiment, the cylindrical mold used at the pressurization-heating step S12 may be formed of a material other than the composite material. In the second embodiment, however, the cylindrical mold needs to be formed of the composite material in consideration of later usage patterns. When the layering step S11 employs the first type method, the adhesion pretreatment step S21 needs to be performed before the layering step S11 because the inner surface of the composite material cylindrical mold 12 and the outermost composite material sheet 11 are in contact with each other at the layering step S11. When the layering step S11 employs the second type method, the adhesion pretreatment step S21 may be performed before at least the pressurization-heating step S12 or before the layering step S11. This is because the inner surface of the composite material cylindrical mold 12 and the outermost composite material sheet 11 are not in contact with each other at the layering step S11, and they are in contact with each other at the pressurization-heating step S12.

Figure 10:
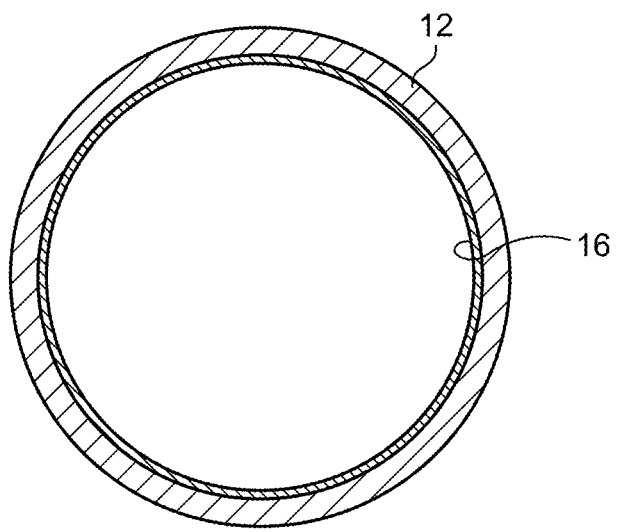
FIG. 10 is an explanatory view explaining an adhesion pretreatment step in FIG. 9.
Figure 11:
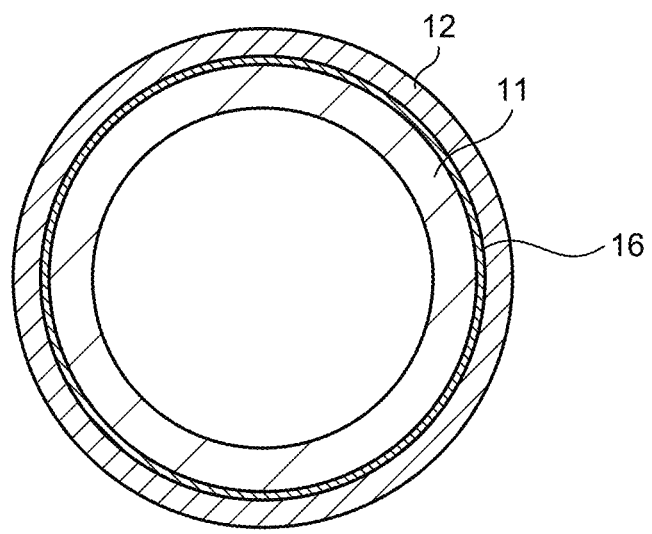
FIG. 11 is an explanatory view explaining a state where composite material sheets are layered after the adhesion pretreatment step in FIG. 9.

FIG. 10 is an explanatory view explaining the adhesion pretreatment step S21 in FIG. 9. FIG. 11 is an explanatory view explaining a state where the composite material sheets 11 are layered after the adhesion pretreatment step S21 in FIG. 9. At the adhesion pretreatment step S21, as exemplarily illustrated in FIG. 10, an adhesive layer 16 is provided on the inner surface of the composite material cylindrical mold 12 so as to allow the adhesive layer 16 to adhere to the outermost composite material sheet 11. More specifically, at the adhesion pretreatment step S21, the adhesive layer 16 is preferably provided after performing surface treatment such as peel ply treatment, sanding treatment, and plasma treatment on the inner surface of the composite material cylindrical mold 12 so as to increase adhesive property.

As illustrated in FIG. 11, which illustrates the composite material sheets 11 layered after the adhesion pretreatment step S21, the inner surface of the composite material cylindrical mold 12 and the outermost composite material sheet 11 are disposed in close contact with each other with the adhesive layer 16 interposed therebetween. When the pressurization-heating step S12 is performed in the state illustrated in FIG. 11, the inner surface of the composite material cylindrical mold 12 and the outermost composite material sheet 11 adhere to each other with the adhesive layer 16 interposed therebetween.

As a result of the adhesion pretreatment step S21, the layering step S11, and the pressurization-heating step S12 that are performed in this order, as illustrated in FIG. 11, the cylindrical composite material according to the second embodiment is obtained that includes the multiple composite material sheets 11 layered in a cylindrical shape, the composite material cylindrical mold 12 provided on the outer surface of the composite material sheet 11, and the adhesive layer 16 that adhesively bonds the composite material sheet 11 and the composite material cylindrical mold 12.

The forming method of a cylindrical composite material according to the second embodiment described above can obtain, at the pressurization-heating step S12, the cylindrical composite material in which the composite material cylindrical mold 12 is adhesively bonded to the outer surface of the layered composite material sheets 11. The composite material cylindrical mold 12 can increase accuracy in outer surface shape of the cylindrical composite material.

In the second embodiment, the adhesive layer 16 is provided so as to adhesively bond the outer surface of the layered composite material sheets 11 and the inner surface of the composite material cylindrical mold 12 with the adhesive layer 16 interposed therebetween. The invention is not limited to this example. Other adhesive bonding methods may be employed such as a method in which the resin included in the outermost composite material sheet 11 or the resin included in the inner surface side of the composite material cylindrical mold 12 is used for adhesive bonding.

It is preferable for the cylindrical composite material according to the second embodiment that the inner-outer radius ratio, which is a ratio of the inner radius to the outer radius, is smaller than 0.95 and the inner radius is equal to or larger than 100 mm in the whole of the material including the composite material sheets 11 layered in a cylindrical shape, the adhesive layer 16, and the composite material cylindrical mold 12. The cylindrical composite material thus structured has the same operational advantage as the cylindrical composite material 10 according to the first embodiment.

Third Embodiment

Figure 12:
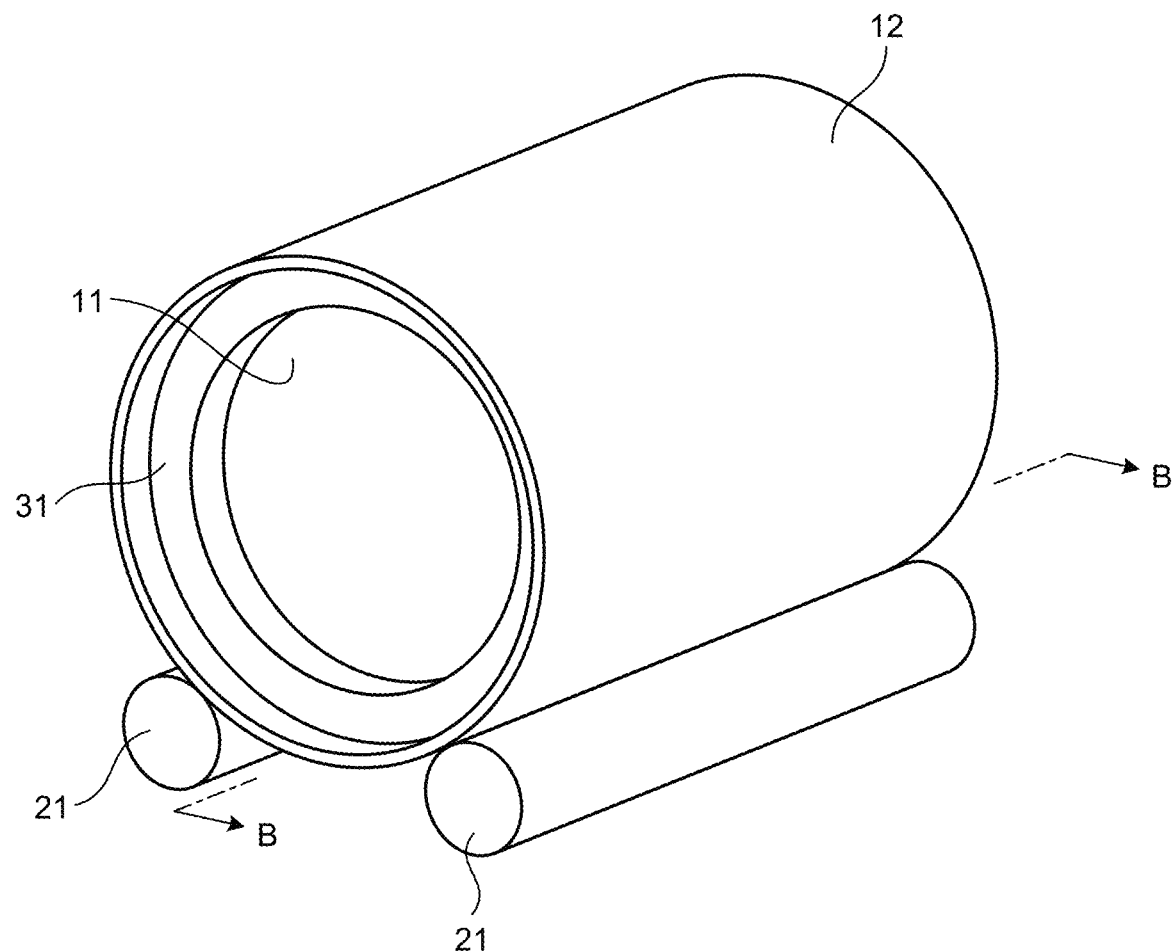
FIG. 12 is an explanatory view explaining the pressurization-heating step in a forming method of a cylindrical composite material according to a third embodiment.
Figure 13:
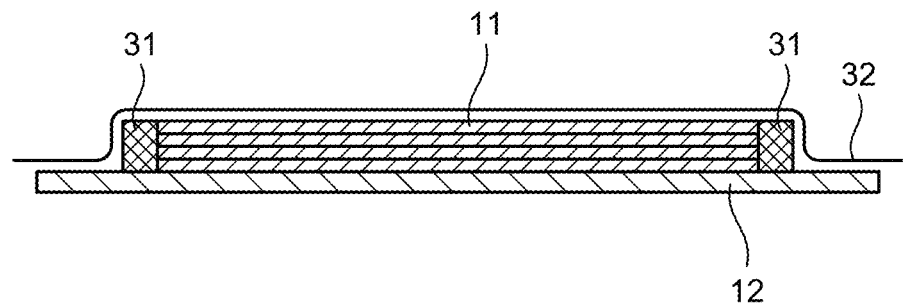
FIG. 13 is a cross-sectional view taken along B-B in FIG. 12.

FIG. 12 is an explanatory view explaining the pressurization-heating step S12 in a forming method of a cylindrical composite material according to a third embodiment. FIG. 13 is a cross-sectional view taken along B-B in FIG. 12. As illustrated in FIGS. 12 and 13, at the pressurization-heating step S12 in the forming method of a cylindrical composite material according to the third embodiment, cylindrical composite material dam members 31 are disposed at positions on both end sides in the axial direction of the cylindrical composite material sheets 11 disposed on the inner surface of the composite material cylindrical mold 12 and inside a pressurization-heating case 32 used in pressurization and heating. The composite material dam members 31 have the same linear expansion as the composite material cylindrical mold 12 used at the pressurization-heating step S12, have a ring shape, and protect both end sides in the axial direction of the cylindrical composite material sheets 11. The other structure other than that described above of the forming method of a cylindrical composite material according to the third embodiment is the same as that of the forming method of a cylindrical composite material according to the first embodiment. In the forming method of a cylindrical composite material according to the third embodiment, the same numerals are used for the same structure as the first embodiment and detailed descriptions thereof are omitted.

The forming method of a cylindrical composite material according to the third embodiment described above can protect both end sides in the axial direction of the composite material sheets 11 from pressure applied externally via the pressurization-heating case 32 by the composite material dam members 31 having the same linear expansion coefficient as the composite material sheets 11 and the composite material cylindrical mold 12, and can also reduce the possibility of the meandering portion occurring in the axial direction. As a result, the forming method of a cylindrical composite material according to the third embodiment can increase accuracy in shape on both end sides in the axial direction of the cylindrical composite material.

REFERENCE SIGNS LIST

10 cylindrical composite material
11 composite material sheet
11a splice
12 composite material cylindrical mold
13 cylindrical mold
15 sealed pressurization-heating device
16 adhesive layer
20 inner surface layering device
21 support roller
22 press roller
22a shaft end
24 roller supporting member
31 composite material dam member
32 pressurization-heating case

What is claimed is:
1. A forming method of a cylindrical composite material, the forming method comprising:
   layering a plurality of composite material sheets in a cylindrical shape with splices formed between ends of adjacent composite material sheets such that phases of the splices in a circumferential direction differ from each other;
   heating the composite material sheets layered at the layering while pressurizing the composite material sheets in a state where the layered composite material sheets are disposed along an inner surface of a composite material cylindrical mold to cause a resin included in the composite material sheets to react to combine the composite material sheets to be formed in the cylindrical shape; and
   performing an adhesion pretreatment that is performed before the heating and allows the inner surface of the composite material cylindrical mold to adhere to an outermost composite material sheet of the layered composite material sheets.

2. The forming method of a cylindrical composite material according to claim 1, wherein, at the layering, the composite material sheets are inwardly layered on the inner surface of the cylindrical mold.

3. The forming method of a cylindrical composite material according to claim 1, wherein, at the layering, the composite material sheets are outwardly layered on an outer surface of another cylindrical mold different from the cylindrical mold used at the heating, and after the layering, the other cylindrical mold is pulled out.

4. The forming method of a cylindrical composite material according to claim 1, wherein, at the heating, dam members having a ring shape are disposed at positions on both end sides in an axial direction of the composite material sheets disposed on the inner surface of the cylindrical mold and inside a pressurization-heating case used in pressurization and heating, the dam members have the same linear expansion as the cylindrical mold used at the heating and protect both end sides of the composite material sheets in the axial direction of the composite material sheets.

5. A forming method of a cylindrical composite material, the forming method comprising:
   layering a plurality of composite material sheets in a cylindrical shape with splices formed between ends of adjacent composite material sheets such that phases of the splices in a circumferential direction differ from each other; and
   heating the composite material sheets layered at the layering while pressurizing the composite material sheets in a state where the layered composite material sheets are disposed along an inner surface of a composite material cylindrical mold to cause a resin included in the composite material sheets to react to combine the composite material sheets to be formed in the cylindrical shape,
   wherein, at the heating, dam members having a ring shape are disposed at positions on both end sides in an axial direction of the composite material sheets disposed on the inner surface of the cylindrical mold and inside a pressurization-heating case used in pressurization and heating, and the dam members have the same linear expansion as the cylindrical mold used at the heating and protect both end sides of the composite material sheets in the axial direction of the composite material sheets.

6. The forming method of a cylindrical composite material according to claim 5, wherein, at the layering, the composite material sheets are inwardly layered on the inner surface of the cylindrical mold.

7. The forming method of a cylindrical composite material according to claim 5, wherein, at the layering, the composite material sheets are outwardly layered on an outer surface of another cylindrical mold different from the cylindrical mold used at the heating, and after the layering, the other cylindrical mold is pulled out.

* * * * *